United States Patent [19]

Hara

[11] 3,977,784

[45] Aug. 31, 1976

[54] CONDENSER DEVICE FOR LIGHTING AN ORIGINAL

[75] Inventor: Kazuyuki Hara, Yokohama, Japan

[73] Assignee: Ricoh Co., Ltd., Japan

[22] Filed: Feb. 6, 1975

[21] Appl. No.: 547,492

[30] Foreign Application Priority Data

Feb. 7, 1974   Japan.......................... 49-15894[U]

[52] U.S. Cl. .............................. 355/67; 240/41 R; 240/41.35 R

[51] Int. Cl.² ........................................ G03B 27/16

[58] Field of Search .................. 355/67, 65, 66, 48, 355/49, 50, 51, 8; 240/41 R, 41.35 R, 41.35 D, 41.35 C, 1.3

[56] References Cited
UNITED STATES PATENTS

| | | | |
|---|---|---|---|
| 1,336,967 | 4/1920 | Laird | 240/41.35 D |
| 1,981,328 | 11/1934 | Rürer | 240/41 R |
| 3,532,424 | 10/1970 | Miles | 355/51 X |
| 3,728,015 | 4/1973 | Oprairl | 355/51 X |

Primary Examiner—L. T. Hix
Assistant Examiner—E. M. O'Connor
Attorney, Agent, or Firm—McGlew and Tuttle

[57] ABSTRACT

A condenser device for lighting an original as used in a facsimile or copying machine incorporates an elliptical or similar reflecting mirror. A light shield associated with a light source is provided with a pair of reflecting surfaces, one of which directs light incident thereon from the light source onto the elliptical reflecting mirror and thence to the other surface for reflection to a slitwise area to be scanned where it is combined with light following a direct path including the light source and the mirror.

9 Claims, 1 Drawing Figure

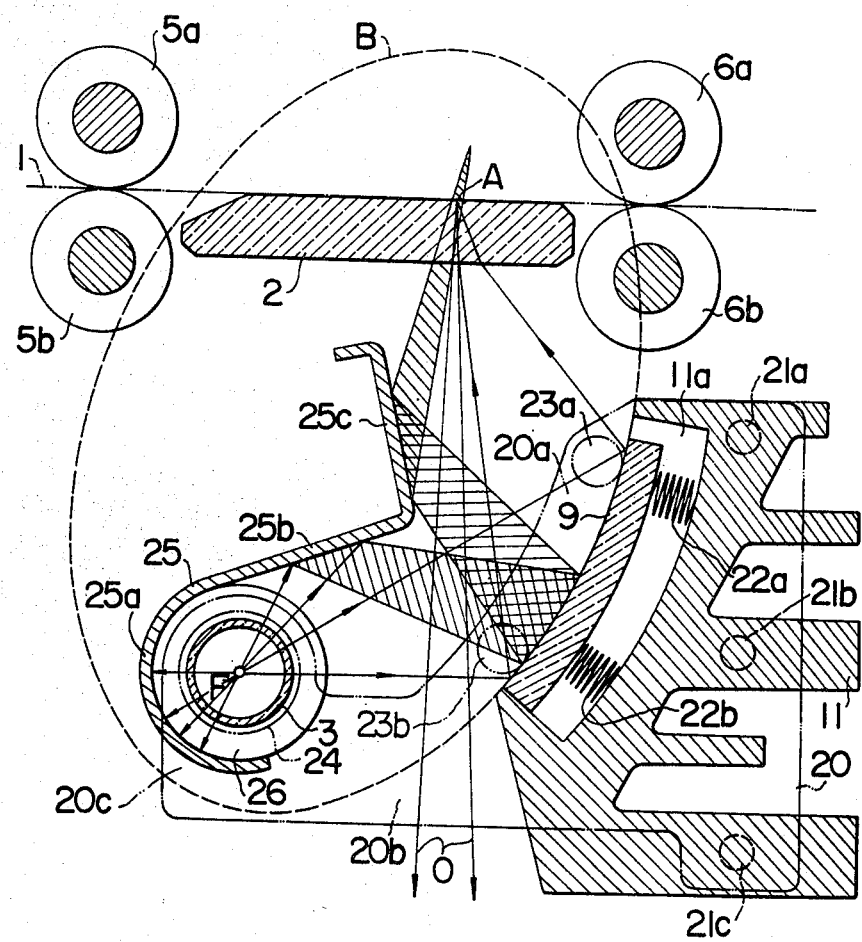

CONDENSER DEVICE FOR LIGHTING AN ORIGINAL

BACKGROUND OF THE INVENTION

The invention relates to a condenser device for lighting an original as used in a facsimile or copying machine, and in particular, to such device which incorporates an elliptical or similar reflecting mirror for focussing light from a light source onto the surface of the original at a given slitwise zone.

It is known that the efficiency of the condenser device of the kind described, namely, the amount of light available on the original relative to the total radiation from the light source, is considerably low even though it is improved over the use of a simple condenser lens. It is evident that an elliptical reflecting mirror having a high aperture angle is effective to improve the efficiency, but the use of such a mirror results in an increased cost and may frequently be inhibited because of the space limitation. Furthermore, where a so-called cold mirror is required for preventing a severe high temperature at a light concentrated area on a target glass plate as in a facsimile system in which the target plate and condenser device are stationary and an original to be scanned runs on the target plate, one having such a high aperture angle is unavailable in fact.

On the other hand, diffuse light which is not concentrated on a given focussing area may have adverse influences on the various parts of the machine or their operation. By way of example, in a facsimile system, such diffuse light may introduce noises into an electrical signal which is to be formed from the reflective light from the original. Thus, the condenser device must be provided with a light shield.

SUMMARY OF THE INVENTION

It is one object of the invention to provide an improved condenser device for lighting an original which achieves a higher rate of effective light available on the original over the total radiation from the source while avoiding the use of a wide angle reflecting mirror.

In one embodiment of the invention, there is provided a light shield having a pair of reflecting surfaces, one of which directs light incident thereon from a light source onto an elliptical reflecting mirror, which reflects it onto the other surface and thence to a concentrated area where it is combined with light that is directly reflected by the reflecting mirror.

BRIEF DESCRIPTION OF THE DRAWING

The single DRAWING is a vertical cross section of the condenser device constructed in accordance with the invention.

DETAILED DESCRIPTION OF ONE EMBODIMENT

The condenser device shown can be used to provide a slitwise exposure in a facsimile system or copying machine. An original 1 to be scanned is placed on a guide (not shown) which is disposed on a target glass plate 2, and is driven by two pairs of rollers 5a, 5b and 6a, 6b so as to run thereover at a constant speed.

Disposed below target plate 2 are a light source which may be a tubular lamp 3 and a reflecting mirror 9 having a reflecting surface which conforms to a portion of an elliptical surface B indicated in broken lines and extending perpendicular to the plane of the drawing. A mirror retaining member 11 secured to the body of the machine (not shown) has on its front or left-hand side a recess 11a having a bottom which is evenly spaced apart from elliptical surface B and on its rear or right-hand side heat dissipating fins. A pair of support plates 20 (only one being shown) are secured at their right-hand portions to the respective remaining two sides of member 11 as by set screws 21a, 21b, 21c.

The reflecting mirror 9 is received within the recess 11a and is supported on three or four compression springs 22a, 22b (only two being shown). Three or four locating pins 23a, 23b (only two being shown) for locating the mirror 9 are secured to a portion 20a of the support plate 20 which extends slightly beyond the front surface of the retaining member 11. Preferably, the mirror 9 is a cold mirror reflector which transmits light in the infrared region of the spectrum. In addition, the mirror 9 may be replaced by a cylindrical or any other similar reflecting mirror as far as it effects the slitwise concentration of light from a light source as required.

The support plates 20 also include forwardly extending arms 20b, on the ends 20c of which is mounted a socket 24 for receiving lamp 3. The lamp 3 may be a halogen lamp or any other lamp which has a wire-shaped filament F located along its axis to serve as a light source. It is important to note that the filament F is positioned at one of the foci of the ellipse B so that light emitted therefrom is reflected by the mirror 9 onto a concentrated point (slitwise area) A on the plate 2 which is located in coincidence with the other focus of the ellipse.

As mentioned previously, it is desirable that ray of light from the light source F other than that which impingines directly on the mirror 9 be shielded from the outside or preferably some means be provided to concentrate such light for effective use at the area A. In accordance with the invention, such means comprises a light shield and reflecting member 25 formed of a sheet material such as aluminium which has a bright finished surface on one side. One end 25a of the member 25 is rolled into a semi-cylindrical form with the bright finished surface inside, the semi-cylindrical end 25a being wrapped around circular insulators 26 of the socket 24 and secured thereto by suitable means so that the end portion 25a has its center at point (line) F. The member 25 also includes a region 25b contiguous with the end portion 25a and which extends toward the mirror 9 without interfering with the direct light path from the light source to the mirror 9, and another region 25c which is bent from the region 25b so as to extend substantially in a vertical direction. The bright finished surface of the regions 25b, 25c define a reflecting surface, respectively. The presence of the light shield and reflecting member 25 is effective to prevent diffuse light from the light source F and to reflect and direct it to the concentrated point A. In the drawing, the path followed by those rays of light which are directed from the light source F onto the reflecting surface of the region 25b is shown hatched, such rays being reflected onto the reflecting mirror 9 and thence to the reflecting surface of another region 25c of the member 25, which finally directs these rays to the vicinity of the concentrated point A.

Concentration of light through the use of a pair of completely plane reflecting surfaces as illustrated will not produce a perfect coincidence with the intended concentrated point A, but either or both of the reflecting surfaces may be formed with a curvature to achieve such coincidence.

Light O reflected from the original 1 at the concentrated area A can be converted into an electrical signal in a facsimile system or directly used as a slitwise exposure in a copying machine.

It will be appreciated that according to the invention, a major amount of light from a light source is concentrated at a slitwise area to be scanned by the use of the mirror of a relatively small aperture angle and the two reflecting surfaces of the light shield member, and in spite of this, a severe high temperature at the slitwise area is prevented, since any light ray incident on the area is once passing the mirror where the infrared region of the spectrum is removed therefrom.

While in the embodiment described the original moves on the target plate relative to the stationary condenser device, it is apparent to those skilled in the art that such relation can be readily inverted when required to do so within the scope of the appended claims.

What is claimed is:

1. A facsimile device for concentrating light along a slit zone on an original, comprising a light source, a reflecting mirror for concentrating light from said light source onto the slit zone on an original, a light shield member generally surrounding said light source while avoiding interfering with the path of light passing from the light source through the reflecting mirror onto the slit zone, the light shield member being formed with first reflecting surface extending obliquely upwardly and toward said mirror and a second reflecting surface extending upwardly away from said first surface toward said slit zone, the first reflecting surface directing light incident thereon from the light source onto the reflecting mirror, the second reflecting surface cooperating with the reflecting mirror so as to direct light reflected by the mirror onto the slit zone; and means for feeding originals to be copied to said slit zone.

2. A facsimile device according to claim 1 in which the first and second reflecting surfaces are in respective planes which form an angle therebetween depending on the position of the light source, the reflecting mirror and the given zone.

3. A facsimile device according to claim 1 in which either one or both of the first and second reflecting surfaces comprises curved surfaces designed to increase the degree of concentration of light thereof onto the given zone.

4. A facsimile device according to claim 1 in which the light shield member comprises a sheet member which is bright finished on at least the first and second reflecting surfaces.

5. A facsimile device according to claim 1 in which the reflecting mirror is a cold mirror reflector which transmits light in the infrared region of the spectrum.

6. A device for concentrating light in a light zone, comprising a light source having a light point origin, means defining a light concentrating area spaced from said light source, a reflecting mirror having an exposed reflecting surface formed as a portion of an elliptical surface disposed between said light source and said area, a combination light shield and reflecting member having a portion surrounding one side of said light source on the side opposite to said mirror and having an oblique portion extending toward said mirror and toward said area and positioned to reflect light from said light source to said mirror, said combination light shield and reflecting member also including a generally upright portion extending from said oblique portion toward said area positioned to receive light from said mirror and to reflect it to said area, said mirror being positioned to receive light from said light source directly and from said combination light shield and reflecting member oblique surface and to direct portions of said light to said upright portion of said combination light shield and reflecting member and to said area.

7. A device according to claim 6, including a mirror mounting support, a plurality of springs carried on said mounting support between said mirror and said support and supporting said mirror, and a plurality of locating pins overlying said mirror and contacting a portion of the surface thereof for locating the surface in respect to said light source.

8. A device according to claim 6, wherein said light concentrating area comprises a transparent support plate, means associated with said plate for feeding an original to be copies over said plate, said transparent support plate being located so that the light is concentrated by said mirror and said combination light shield and reflecting member along a concentrated slit area thereon, the space below said area between said mirror and said combination light shield and reflecting member being open to reflect light from the original into an electrical system of a facsimile machine.

9. A copying device for use with an electrical system of a facsimile machine comprising a transparent target plate, means for feeding an original over said transparent target plate, a light source located below said target plate, a reflecting mirror having an exposed reflecting surface forming a portion of an elliptical surface disposed alongside said light source in a position to reflect light upwardly into a concentrated area of said target plate, a combination light shield and reflecting member having a cylindrical portion surrounding the side of said light source which is remote from said mirror so as to reflect light from said light source toward said mirror, said combination light shield and reflecting member also having an obliquely extending portion extending from said semi-cylindrical portion toward said mirror so as to reflect a portion of the light from said light source to said mirror, said combination light shield and reflecting member also having a substantially upright portion extending upwardly from said oblique portion toward said target plate in a position to reflect light from said mirror to said target plate in a concentrated area thereof, the space between said combination light shield and reflecting member and said mirror being opened downwardly below said target plate for the passage of light rays reflected from the original to the electrical system of the facsimile machine.

* * * * *